UNITED STATES PATENT OFFICE.

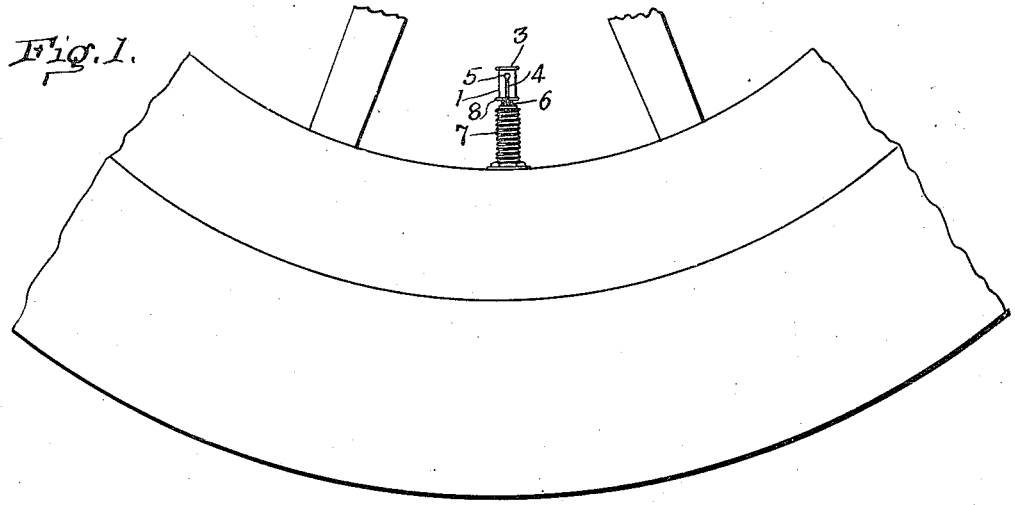
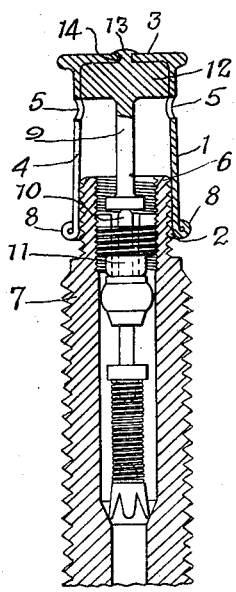
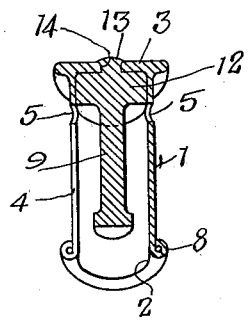

HENRY L. PERRYMAN, OF JACKSONVILLE, FLORIDA.

TIRE-DEFLATER.

1,145,210.  Specification of Letters Patent.  Patented July 6, 1915.

Application filed April 20, 1914. Serial No. 833,020.

*To all whom it may concern:*

Be it known that I, HENRY L. PERRYMAN, a citizen of the United States, residing at Jacksonville, in the county of Duval and State of Florida, have invented certain new and useful Improvements in Tire-Deflaters, of which the following is a specification, reference being had therein to the accompanying drawing.

This invention relates to tire deflaters or devices for opening and holding open the valve of a pneumatic tire to permit the air to escape therefrom.

The object of the invention is to provide a very simple, compact device which can be readily slipped onto and off of the nipple of a valve tube and which will frictionally engage the tube to retain the device thereon and hold the valve open; further, to provide such a device which will be of a smooth, regular exterior having no projecting parts, whereby it can be conveniently carried in the pocket or on the end of a pencil; and further, to provide a device of this kind which can be manufactured and placed on the market at a low cost.

In the accompanying drawings, Figure 1 is a side elevation of a section of a pneumatic tire showing a valve tube with a deflater applied thereto; Fig. 2 is a longitudinal, sectional view of a portion of the valve tube and of the deflater; and Fig. 3 is a perspective, sectional view of the deflater.

My invention consists in an annular or cylindrical body of resilient material, the body being preferably split along one side to permit of the expansion and contraction thereof and enable it to be slipped onto the nipple of the valve tube and to be retained thereon by the friction due to the contraction of the body. Carried by this resilient body is a plunger or stud which is spaced away from the circumferential wall thereof and arranged to enter the valve tube, engage the valve stem to open the valve and to hold the same open so long as the device remains upon the valve tube.

The device may take various forms as to its details of construction and in the accompanying drawings I have illustrated one embodiment of the same in which I have shown it as comprising a cylindrical body portion 1 of resilient metal having its one end open, as indicated at 2, and its other end closed, as at 3. This cylindrical body portion is split longitudinally from the open end thereof to a point near the closed end thereof, as indicated at 4, and is preferably provided with one or more openings 5, through which the air may escape. The internal diameter of the cylindrical body portion is slightly less than the external diameter of the end portion or nipple 6 of a standard valve tube 7. Consequently, when the cylindrical body portion is forced onto this nipple it is expanded and the metal is caused to grip the nipple, thus retaining the deflater on the tube. The edge of the cylinder at the open end thereof is preferably turned outwardly and upwardly, as shown at 8, to form a rib which stiffens the end of the cylinder and increases its gripping powers. A plunger or stud 9 is carried by the cylinder, has its end spaced away from the circumferential wall thereof and is so arranged with relation to the open end of the cylinder that when the cylinder is placed upon the nipple of the valve tube, the plunger will engage the end of the stem 10 of the valve 11 mounted within the tube and move the valve to its open position. The stud 9 may be mounted in the cylinder in any suitable manner. In the present embodiment of the device it is shown as secured to the closed end 3 of the cylinder. To this end the stud is provided with an enlarged portion 12 which fits snugly in the cylindrical body portion against the closed end 3 thereof and beyond the opening 5. This enlarged portion has a lug 13 which constitutes a rivet and extends through an opening 14 in the closed end of the cylinder and when this lug has been upset the stud is firmly secured within the cylindrical body portion of the deflater.

The operation of the device will be readily understood from the foregoing description and it will be apparent that the device itself is of a very simple structure, comprising but two parts, and these parts being rigidly secured one to the other; that the exterior contour of the device is smooth and without projections of any kind, thus enabling it to be carried in the pocket or about the person without inconvenience; and further, that the device may be produced at a very low cost.

While I have shown and described one embodiment of the invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. A device of the character described comprising a split cylinder having one end open and the other end closed, and a stud mounted within said cylinder and having the end adjacent the open end of said cylinder spaced away from the circumferential walls thereof, said stud having an enlarged portion which fits within said cylinder and against the closed end thereof.

2. A device of the character described comprising a cylinder open at one end, closed at the other end, split longitudinally thereof at its open end and having openings between the ends thereof, and a stud mounted within said cylinder and spaced away from the circumferential wall thereof, said stud having at its inner end an enlarged portion fitting within said cylinder and against the closed end thereof and having means for securing said stud to said cylinder, said enlarged portion of said stud being located beyond the openings in said cylinder.

In testimony whereof, I affix my signature in presence of two witnesses.

HENRY L. PERRYMAN.

Witnesses:
NORMAN L. SIMMONS,
MARIE GOFF.